UNITED STATES PATENT OFFICE.

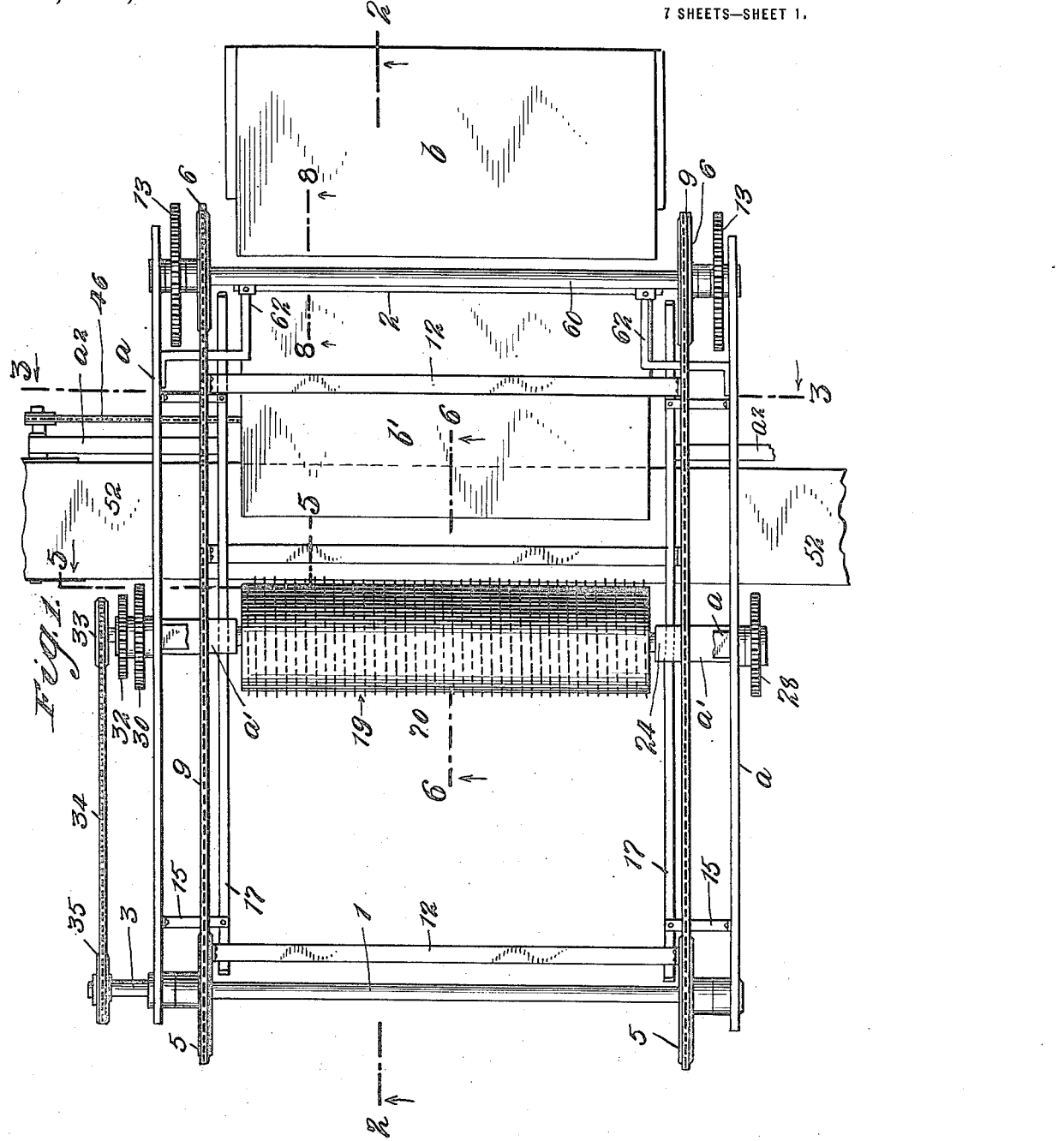

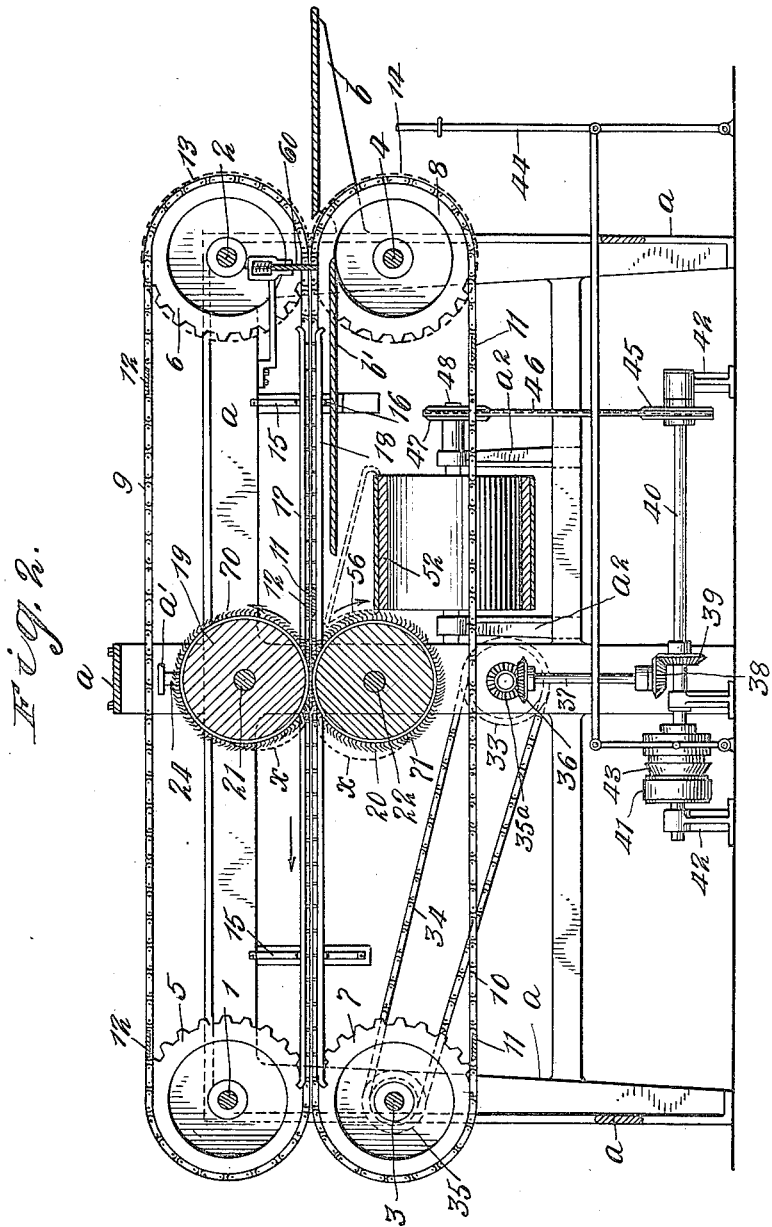

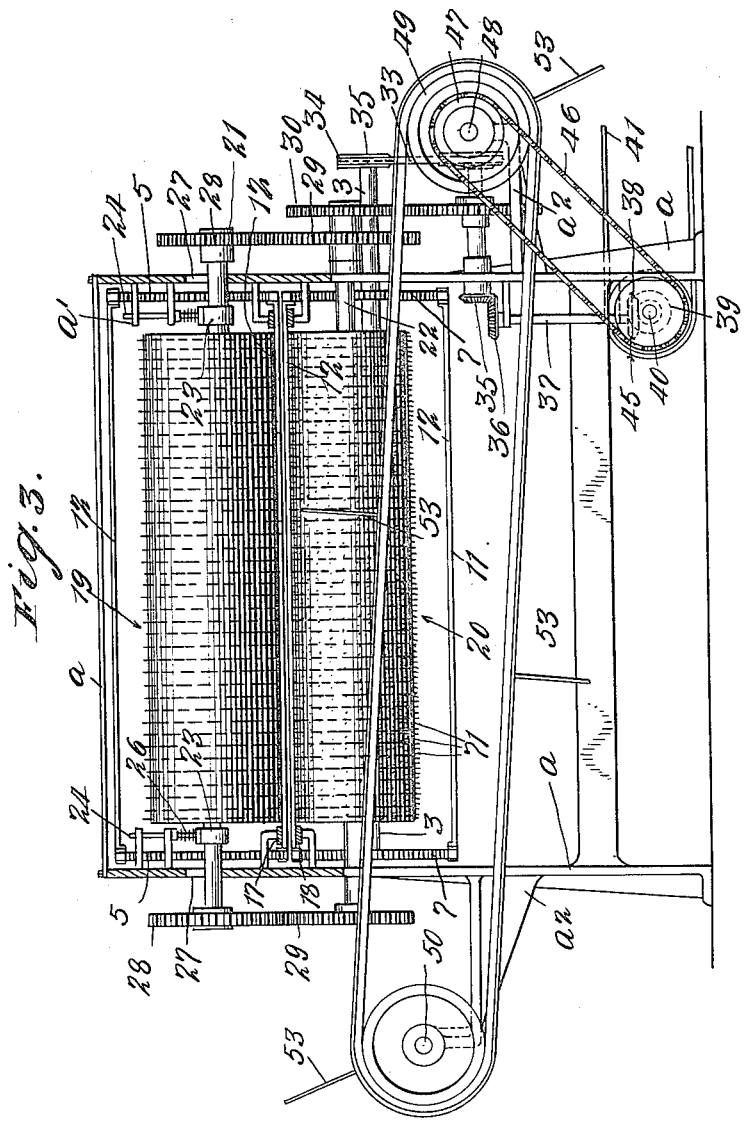

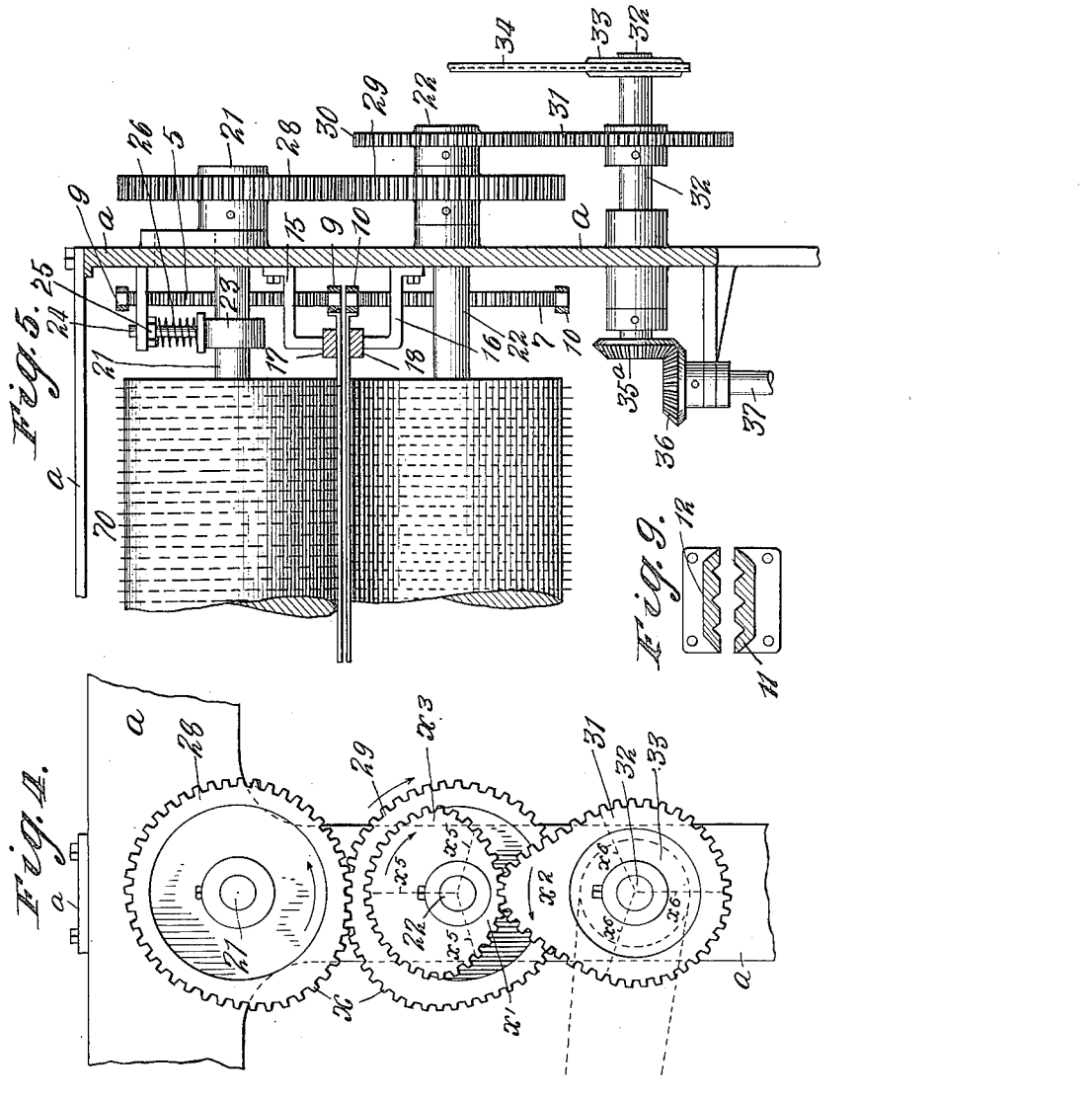

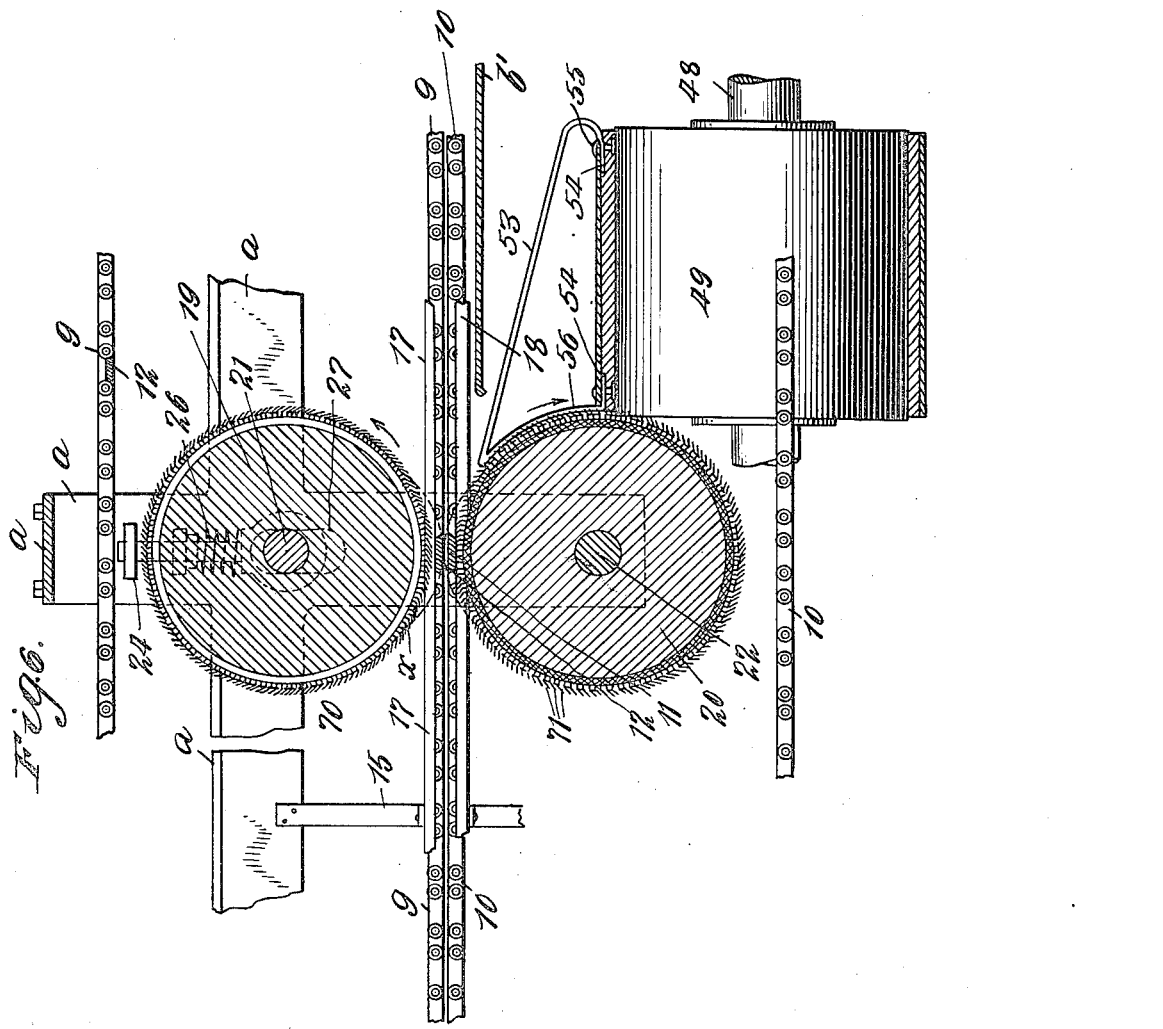

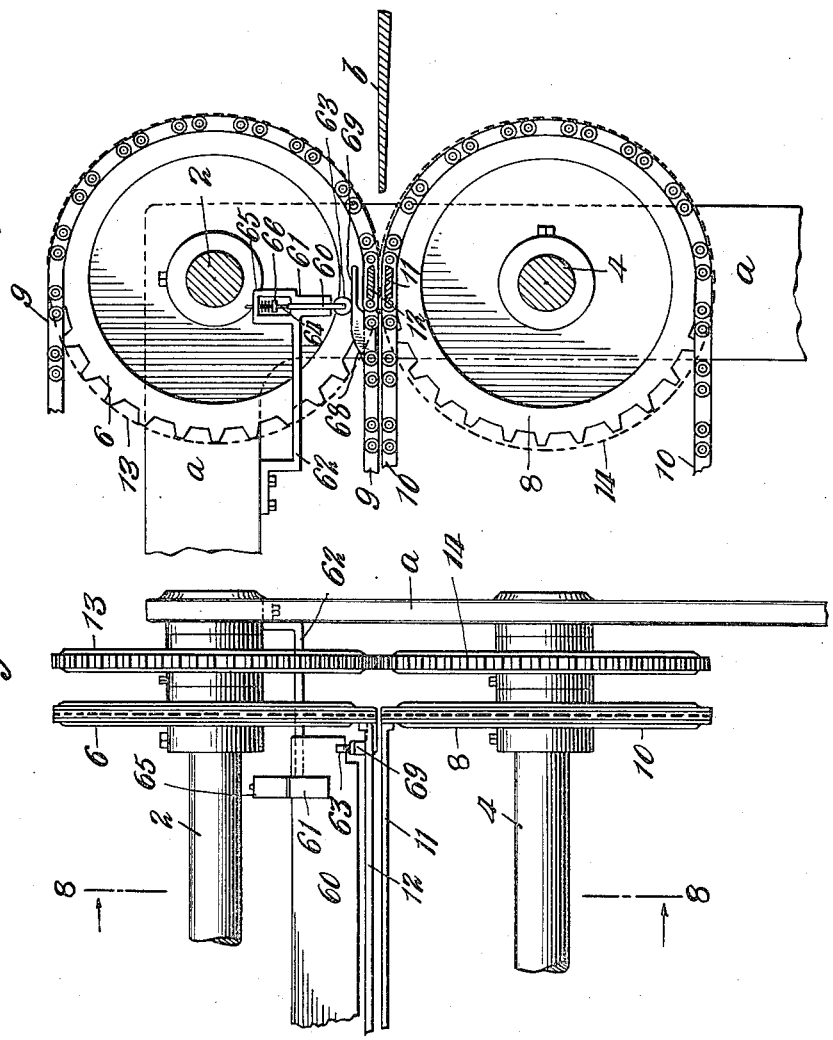

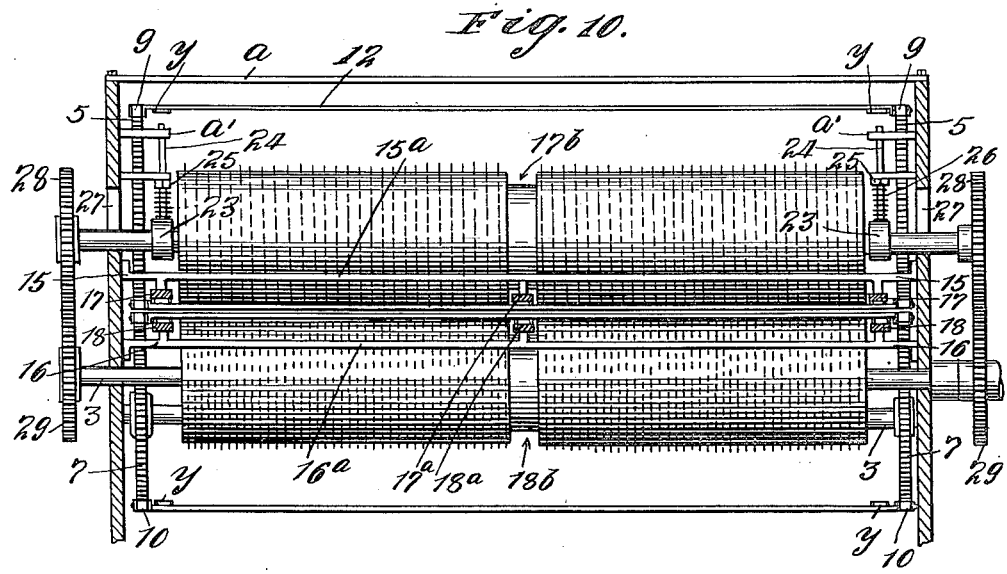
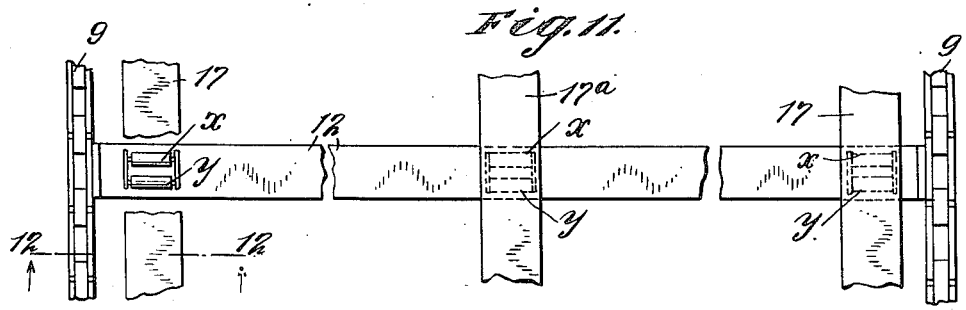
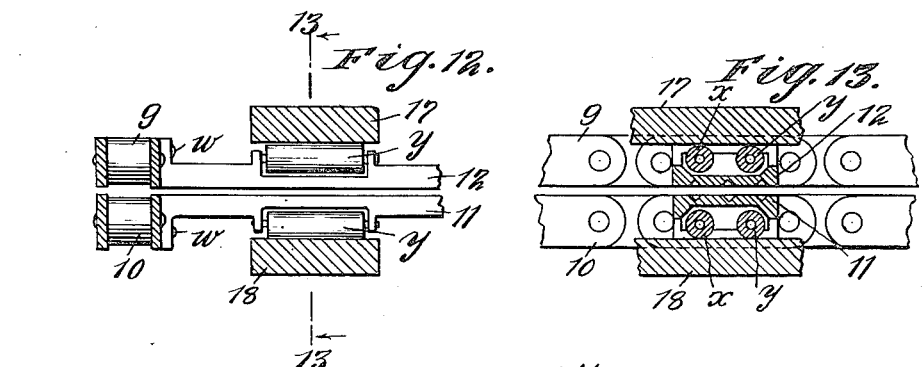

HENRY C. HEBIG, OF NEW YORK, N. Y., ASSIGNOR TO GLOBE TOBACCO MACHINES CORPORATION, A CORPORATION OF NEW YORK.

TOBACCO-STEMMING MACHINE.

1,188,767.  Specification of Letters Patent.  Patented June 27, 1916.

Application filed November 29, 1913. Serial No. 803,682.

*To all whom it may concern:*

Be it known that I, HENRY C. HEBIG, a citizen of the United States, residing at New York city, in the county of New York and State of New York, have invented certain new and useful Improvements in Tobacco-Stemming Machines, of which the following is a specification.

This invention is an improved machine for separating the stems and laminæ of tobacco leaves. Although many patents on machines for this purpose have been issued, the work in question is generally done by hand in a highly non-hygienic manner, and the object of this invention is to produce a machine which will meet the actual requirements in tobacco factories and eliminate, to a greater or less extent, the present, general necessity for hand-stripping. Most prior machines for this purpose have been devised to remove the stem in its entirety from its butt end to its tip end, but the tip end portions are so thin, and of such a quality as to render them fit for use as a commercial portion of the stripped laminæ; and to remove the entire strip is largely to reduce the value of the product of these machines when they are used in extensive operations. It has been heretofore proposed to cut off the butt end portion of the stem, after partial separation of the laminæ from its sides, but the use of a cutting mechanism for this purpose requires such undue exactitude of feed on the part of the machine operator that to cut off the butt end portions of the stems, without running the machine at a prohibitorily low speed, occasions constant cutting of the lamina at each side of the stem, the cutters proposed operating transversely on the stem at a predetermined point between the butt and tip ends thereof. To compete successfully with the hand-stripping operations, a machine must remove a considerable portion of the stem without tearing or wasting the adjacent laminæ; and the machine must operate in such wise as not at any stage of the operation to rag the leaf, which is always a valuable commercial product, and which is always tender, even when conditioned for the stemming operation by steaming or otherwise.

It is the purpose of this invention to produce a high-speed machine for the indicated purpose, that is practically operable without injury to the laminæ, and which is specifically adapted for separating from the laminæ only a predetermined portion of the stem. Nevertheless, the machine may be used for effecting the complete separation of the laminæ and stem of a tobacco leaf, if so desired.

In Figures 1 to 9, inclusive, of the accompanying drawings, the machine is of a width adapted for use with small leafed varieties of tobacco and need not have the anti-friction devices shown in Figs. 10 to 13 on its way-forming bars for the stem-gripping jaw-bars unless so desired. In Figs. 1 to 9, they are omitted because they are not essentials, and for greater clearness. They may be used, however, if preferred.

Referring to the accompanying drawings forming a part hereof and illustrating the present improvements in the best forms now known to me,—Fig. 1 is a top plan view of the machine; the conveyer-belt actuating mechanism being partially omitted for greater clearness. Fig. 2 is a central, vertical, sectional elevation at line 2—2 of Fig. 1, looking in the direction indicated by the arrow at said section line. This view also shows the driving mechanism of the machine, including the driving mechanism of the conveyer-belt. Fig. 3 is a transverse section of the machine at a line corresponding to line 3—3 of Fig. 1, looking in the direction of the arrow at said line. This view also shows the conveyer-belt (carrying wipers) and its driving mechanism in elevation. Fig. 4 is a side elevation of one form of mechanism for continuously rotating the stripper rolls, separating such rolls during their continuous rotation for passage between them of stem-gripping jaw-bars, and for accelerating the speed of rotation of the stripper rolls during a portion of each of their periods of rotation, to break off the stems at the point desired and to secure quick ejection of separated laminæ from the stripping rolls. Fig. 5 is a view partially in section at line 5—5 of Fig. 1, and partially in elevation. It shows portions of the coöperating stripping rolls with a pair of transverse stem-gripping jaw-bars approaching the rolls; longitudinally extending way-bars for holding the gripping jaw-bars properly in position during their stem-gripping movements; means for moving the upper stripping roll toward the lower stripping roll; and, in edgewise elevation, the gear mechanism shown in Fig. 4, together with portions of the driving mechanism of the machine. Fig. 6 is a view, partly in section, at a line corresponding to line 6—6 of Fig. 1, and shows in sectional elevation upper and lower, endless, sprocket-chains carrying the transverse stem-gripping jaw-bars, the stripper-rolls and portions of their actuating mechanism, the conveyer belt structure and one of the wipers carried by the conveyer belt and adapted to clean separated laminæ from the lower stripping-roll. The rolls are in separated position. Fig. 7 is a partial elevational view of the feed-in end of the machine, and shows intermeshing gears that compel the co-working stem-gripping jaw-bars to come properly together for initially gripping the stems, and also shows in partial side elevation a movable, transverse stem-alining bar. Fig. 8 is a side elevational view of the sprockets at the front end of the machine, and is partially in section at a line corresponding to line 8—8 of Fig. 7, and of Fig. 1, to clearly illustrate the construction and mode of operation of the stem-alining bar. Fig. 9 is a cross-sectional view of the stem-gripping jaw-bars. Fig. 10 may be considered as a cross-sectional, vertical elevation at line 5—5 of Fig. 1, and, in addition to parts shown in preceding figures, shows a pair of intermediate way-bars for the stem-gripping jaw-bars, registering annular grooves in the upper and under stripping rolls for reception of the intermediate way-bars, and anti-friction rolls on the upper and under sides of all three sets of jaw-bars. Fig. 11 is a plan view of what may be taken as the upper side of an upper, or the under side of an under, stem-gripping bar, and particularly shows in addition to three way-bars, anti-friction rolls placed in pairs on the jaw-bars, with their axes lengthwise of the jaw-bars, one set for contact with each way-bar, in order to secure an anti-friction movement in which the jaw-bars cannot tip laterally,—that is, edgewise. Fig. 12 is a sectional detail in a vertical plane at line 12—12 of Fig. 11, and shows the ends of a pair of jaw-bars attached to side chains or jaw-bar carriers; upper and lower way-bars for the jaw-bars when in a leaf-gripping position, and anti-friction rolls carried by the jaw-bars. Fig. 13 is a sectional detail at line 13—13 of Fig. 12, and shows a pair of jaw-bars and their anti-friction rolls in engagement with the way-bars, and side elevations of the jaw-bar-carrying chains.

Although the present principal features of novelty relate to the stripper rolls and to the control of the stem-gripping jaw-bars, the machine is described in its entirety, for better understanding of the mode of operation and results of all new features. The stem-gripping jaw-bars are hereinafter called jaw-bars.

Referring to the drawings, a indicates various portions of the frame, which comprises sides and transverse cross-bars to hold the sides together. The rear end of the frame carries a transverse shaft 1, and the front end of the frame a transverse shaft 2. Below, and in vertical line with shaft 1, is a transverse shaft 3, and below, and in vertical line with shaft 2, is a transverse shaft 4. The upper shaft 1 is provided, at each end, with a sprocket 5; shaft 2 is provided, at each end, with a sprocket 6; shaft 3 is provided, at each end, with a sprocket 7; and shaft 4 is provided, at each end, with a sprocket 8. At each side of the machine, sprockets 5 and 6 support an endless sprocket-chain 9, and sprockets 7 and 8 support an endless sprocket-chain 10. The two side-chains 10 are connected, at desired intervals apart, by transverse, metal, under jaw-bars 11, and the chains 9 are similarly connected by transverse, upper jaw-bars 12. Each end of the front, upper sprocket-shaft 2 is provided with a gear 13, and each end of the under, front sprocket-shaft 4 is similarly provided with a gear 14. Gears 13 and 14 are constantly in mesh, and when the machine is in operation serve to bring an under jaw-bar 11 into stem-gripping relation to an upper jaw-bar 12, with certainty. The butt ends of the stems of the tobacco leaves are inserted into the path of the closing jaw-bars from the table b, at the feed-in end of the machine, and when each member of each pair of jaw-bars is directly opposed to another, as shown in Fig. 8, the butt end portion of the stem is firmly held between them, and the leaf is carried rearwardly by the jaw-bars over the supporting platform b' to the stripping members, and thence the stem is pulled toward the rear end of the machine, where it is discharged by separation of the jaw-bars.

The working faces of the jaw-bars are suitably serrated to firmly grip the stems, and should be made of metal or other non-absorbent material, in order that they may not become gummed up by the stem juices, and may be readily cleansed from the juice squeezed out by the grip of the jaw-bars. A cross-sectional view of the preferred form of the jaw-bar serration is shown in Fig. 9, the grooves and channels extending lengthwise of the jaw-bars.

As the jaw-bars are supported transversely of the machine by the side-chains 9 and 10, it is desirable that the chains between the sprockets should be out of frictional contact with other machine parts; and at the same time it is necessary, in order to prevent twisting and breaking of the stems during the forward movement of the leaf or stem, to maintain the operating jaw-bars not only in a fixed horizontal plane, but also to keep them at this time in fixed relation one to the other and to the gripped stems. This is very important, for if the gripped stems are subject to a twisting movement, due to endwise vibrations of the jaw-bars that engage them; or, if one jaw-bar has a lateral tipping movement in relation to the gripped stem and the other jaw-bar, then the stems will be frequently broken off, either before they reach the stripping members, or after they pass between the stripping members and before they reach the point of travel at which it is desired to break off the stems. Any premature breaking of the stems is liable to tear or otherwise injure the blade that is adjacent to the stems before the stripping members are reached; and any premature breaking of the stems after the stripping members have been passed results in a more or less objectionable product.

Accordingly, the machine frame is provided, inwardly of and at each side, with dependent brackets 15 and upwardly-extending brackets 16. At each side of the machine the brackets 15 carry a horizontal, lengthwise-extending way-bar 17, and the brackets 16 carry a horizontal, lengthwise-extending way-bar 18, the way-bars 17 and 18, at each side of the machine, being between the side chains 9 and 10 to which the upper and lower jaw-bars have their ends attached. Each side set of way-bars 17 and 18 is spaced apart to receive between them each end portion (inwardly of their connection with the chains), of a pair of coöperating jaw-bars 11 and 12 with a stem or stems between them. The upper end and under surfaces of the jaw-bars are of a width that prevents them from rocking while in their stem-engaging positions; and the upper and lower way-bars 17 and 18, being in fixed horizontal position, prevent the jaw-bars engaged by them from having any endwise movement during the time that the jaw-bars are gripping the stems and pulling the stems away from the feed-in end of the machine. Each set of way-bars 17 and 18 extends from near the initial stem-gripping position of the jaw-bars to the rear end of the machine, where the jaw-bars are separated in consequence of the upper jaw-bars traveling upwardly in the paths of the upper, rear sprockets 5 and the under jaw-bars traveling downwardly in the paths of the under, rear sprockets 7. Three sets of jaw-bars are shown. Any desired number of sets may be used, depending on the size of the machine.

The stripping members of the machine comprise a pair of coöperating transverse rolls 19 and 20, 19 being the upper roll, and being mounted on a transverse shaft 21. The under roll is mounted on a transverse shaft 22. The rolls are of the same diameter and the shafts 21 and 22 are in the same vertical plane. The surfaces of these rolls are described below. The rolls are continuously rotated during the stripping operation and the unstemmed leaf is fed to the grip-bars butt end first, as in the machine of the Cochrane Patent No. 538,660; but the rolls during each stripping operation on the leaf are given a quick acceleration mainly to eject the stripped leaf, but also to effect a stem-snapping operation on the stem toward its tip end. The speed at which the rolls are rotated is preferably slow and continuous for the best results.

In operation, the under runs of the upper side-chains 9 and the upper runs of the under side-chains 10 carry the jaw-bars in pairs with stems gripped between them, directly between the stripping rolls 19 and 20, said runs then moving toward the rear of the machine, while the leaf-engaging or working surfaces of the stripping-rolls travel in the opposite direction; or generally stated, toward the feed-in end of the machine. These reverse movements are indicated by arrows in Fig. 2.

The under roll is journaled in fixed bearings, while the upper roll 19 on shaft 21 is journaled in vertically movable bearings 23. Each bearing 23 is supported by a vertical rod 24 mounted in an opening in a cross-member $a$ of the frame, and also in a hole through a horizontally projecting web $a'$ of the frame parallel with a member $a$. Between the upper side of a bearing 23 and the under side of web $a'$ (Fig. 5) rod 24 is threaded and provided with a nut 25 for adjusting the tension of a coil-spring 26 around the threaded portion of rod 24 and between the upper side of the bearing and the under side of the tension-adjusting nut 25. Each outer end of the shaft 21 passes through a vertically elongated opening 27 (Fig. 3) in a side-frame, so that the upper roll, during its rotation is adapted to rise away from the under roll and against the tension of the springs 26 to permit the successive sets of jaw-bars to pass between the rolls. After a coöperating set of jaw-bars has passed the rolls, the upper roll is automatically forced by the springs toward the under roll and against the upper surface of the tobacco leaf, the stem of which the jaw-bars are pulling toward the rear of the machine while the working surfaces of the rolls are stripping the leaf laminæ from the sides of the stem.

The gearing and timing of the machine are such that the jaw-bars travel at a high rate of speed while the stripping-rolls rotate in a reverse direction at a very low rotational speed, and continuously, in order that the tender laminæ may be continuously, and as gently as possible, stripped from the sides of the rearwardly moving stem, and with a minimum of crumpling of the separated laminæ at the feed-in side of the stripping rolls. To effect this continuous and slow rotation of the stripping rolls, the ends of each shaft 21 and 22 are provided with continuously intermeshing gears 28 and 29, each of these gears having a high portion $x$ which serves, when in mesh, to push the upper roll upwardly away from the lower roll and against the tension of springs 26 (see Figs. 4 and 5).

To break the leaf stem rearwardly of the stripping-rolls, while the latter are stripping and feeding the laminæ in the direction of the feed-in end of the machine and the jaw-bars in action are pulling the stem of the leaf away from the nip of the stripping rolls toward the rear of the machine, the feed-rolls are, at the desired moment, given a sharp acceleration of speed, whereby, as a result of the opposing movements of the stem and its laminæ, a quick jerk is exerted upon the stem to break it transversely off.

Tobacco leaves vary in length. The sets of coöperating jaw-bars will be spaced at different distances apart on their carrying-chains, according to the varieties of tobacco on which the machine is to be operated, and to effect the breaking of the stems at the point which is usually desired and which is about two-thirds of the distance from the butt end of the stem toward its tip, the acceleration of the speed of the stripping rolls, during each complete rotation thereof, is through about 120 degrees, or one-third of their circumference, as a general rule. To effect this quick acceleration of the continuously rotating and automatically opening and closing stripping-rolls, shaft 22 of the under roll has one of its ends provided with a fixed elliptical gear 30, the lower portion $x'$ whereof is in mesh with the high portion $x^2$ of the therewith meshing irregular gear 31 fixed on a horizontal stud 32 journaled in the machine frame. When the high points $x, x$ of gears 28 and 29 pass out of mesh, the swell $x^3$ of gear 30 meshes with the reduction side $x^4$ of gear 31, and as the radii of gear 30 at and between the dotted lines $x^5$ (Fig. 4) are equal to the radii of gear 31, at and between the dotted lines $x^6$; and as the length of the gear perimeters at and between these radii are about two-thirds of the total length of their perimeters, the rolls rotate at uniform, slow speed while the gears 30 and 31 are in mesh at and between the radii $x^3$ and $x^6$; but when the perimeter of gear 30, at portion $x'$ meshes with the perimeter of gear 31 at portion $x^2$, the speed is accelerated because the maximum radius of gear 31 is much greater than the minimum radius of gear 30, and consequently the gear 30 is given an increase of speed while its short radial teeth are in mesh with the long, radial teeth of gear 31.

A distinct advantage of moving the rolls together, after passage between them of the jaw-bars by means of springs 26, and while the teeth of the gears 28 and 29 are in mesh, is that the downward movement of the upper roll against the upper side of the leaf is gradual and gentle, whereby neither the leaf nor its stem is given a hammerlike blow by the nipping movement of the upper roll.

The slow continuous rotation of the stripping-rolls serves gradually and gently to move the laminæ away from the roll during the stripping and minimizes clogging of the stripped laminæ and consequent breakage thereof.

At its outer end, stud 32 is provided with a sprocket 33 from which a drive-chain 34 extends to a sprocket 35 on the end of shaft 3. The inward end of stud 32 is provided with a beveled gear $35^a$ which meshes with a beveled gear 36 on a vertical shaft 37 at a side of the machine, the lower end of shaft 37 having a beveled gear 38 which meshes with a beveled gear 39 on a horizontal power-shaft 40 that is provided with a power transmission member 41. The power-shaft 40 may be located wherever desired, but is shown journaled in supports 42 at the base of the machine. A clutch mechanism 43 is provided for the power-shaft and power-transmitter, and is provided with a clutch-actuating device having a hand-operating rod 44 at the feed-in end of the machine adjacently to the feed-table $b$. Power-shaft 40 is provided with a sprocket 45, from which sprocket chain 46 runs to a sprocket 47 on a horizontal shaft 48 that is journaled in a bracket $a^2$ located at a side of the frame. Shaft 40 is consequently driven from the power-shaft synchronously with the sprocket shafts 1, 2, 3 and 4 and stripper-roll shafts 21 and 22.

Shaft 48 carries a drum 49 at its side of the machine. At the other side of the machine a bracket $a^2$ supports a horizontal shaft 50, which is provided with a drum 51, the shaft 50 being parallel with the shaft 48. The drums support an endless belt conveyer 52, the upper run of which is in the horizontal plane of the under stripper-roll 20 with the inner edge of the conveyer belt adjacent to the periphery of the under stripper-roll. This conveyer belt is provided at intervals with transversely extending wipers 53 which, at their ends adjacent to the under roll are concave at 56 to conform to the curvature of the roll (Figs. 2 and 6). These wipers are preferably made of flat wire and are secured in place by having their free ends 54 riveted in place at 55, between superimposed plies of the conveyer belt 52. Stripped laminæ fall from the stripping-rolls upon the conveyer belt between the wipers, and the wipers serve to wipe any accumulated laminæ from the lower roll and also from abutments for the stripped laminæ in moving the same transversely out of the machine from the path of its discharge upon the conveyer belt.

Some operators, on some varieties of tobacco, sometimes desire to aline the stem butts when they are inserted from the feed-table into the path of the gripper-bars. The present machine is provided with a butt-alining bar 60 (see Figs. 1, 7 and 8). This bar is vertically slidable in ways formed in a transverse bar 61, which is supported at its opposite end-portions by brackets 62 secured to the side-frames of the machine. Alining-bar 60 is located in a vertical plane slightly forward of the centers of the sprocket-wheels 2 and 4. Its lower corners are provided with wheels 63 and its upper corners are provided with upwardly extending rods 64, which have bearings in upward chambered extensions 65 of the brackets 62. Each rod 64 is provided with a nut 66 between the upper side of which and the under wall of chambered structure 65 a spiral spring 67 is interposed. Springs 67 force the alining-bar positively into its lowest position when it is in the plane of the feed-table, so that the operator may feed a leaf or leaves upon a table forwardly into the path of the gripping jaws with the stem butts against the front side of the alining-bar 60, which is shown in the lowest position in Fig. 2, and in its highest position in Figs. 7 and 8. Just forwardly of each upper gripping-jaw 12 the side-chains 9 are each provided with a cam lug 68, which engages the rolls 63 and lifts the alining-bar just before a pair of coöperating alining-bars are in a position to grip the stem butt or butts. Each cam lug 68 is provided with a rearward extension 69 that keeps in engagement with a wheel 63 while the coöperating pair of jaw-bars 11 and 12 are in their initial, butt-gripping position.

The surfaces of the upper and under rolls is of wire card-clothing 70, the free ends 71 of the bent wires of which all point one way, so that as the roll rotates they point rearwardly or counterwise to the direction of the rotation of the leaf-engaging portions of the roll surfaces.

The machine shown in Figs. 1 to 9, inclusive, is of a moderate width and adapted for stripping a plurality of leaves simultaneously, the leaves being spread out on the feed-table.

When a machine of considerably greater width is desired for the large leafed varieties of tobacco, or to put through a very considerable number of the leaves at the same time, it is desirable to provide an intermediate set of lengthwise-extending way-bars for the middle portion of the coöperating jaw-bars when they are in stem-gripping position.

In Fig. 10, the way-bar-carrying brackets 15 and 16 have transverse connecting portions 15$^a$ and 16$^a$, and midway of the lengths of the stripper rolls support intermediate lengthwise extending way-bars 17$^a$ and 18$^a$, the upper roll being formed with an annular groove 17$^b$ and the under roll with an annular groove 18$^b$, the grooves registering and forming a space for reception of the intermediate way-bars. As shown in Figs. 11, 12 and 13, the upper and under jaw-bars 12 have mounted on the upper and under sides, respectively, sets of anti-friction rolls $x$ and $y$, the axes of which extend lengthwise of the jaw-bar. By mounting the anti-friction rolls in sets and with their axes in line with the jaw-bars and at right angles to the way-bars, no lateral or edgewise tipping of the jaw-bars on a gripped stem can occur. Such action would frequently crush or cut off the stems during the stem-pulling movements of the jaw-bars. The ends of the jaw-bars are secured to the chains by fasteners $w$.

The rolls 20 and 21 are best rotated very slowly but continuously. The stem-gripping bars on the other hand are given a rapid travel. The rolls rotate so as to strip the leaves in the same manner as in Cochrane's United States Patent No. 538,660 of May 7, 1885.

What I claim is,—

1. The combination of a pair of stripping rolls and their shafts with an eccentric spur gear on each shaft, one spur gear meshing with the other; and another pair of intermeshing eccentric spur gears, one on a stripping-roll shaft and the other on a bearing for driving means; and said driving means; the parts operating to rotate the rolls continuously and to separate the rolls during their rotation.

2. The combination of a pair of stripping-rolls and their shafts with an eccentric spur gear on each shaft, one gear meshing with the other, and another pair of intermeshing eccentric spur gears, one on a stripping-roll shaft and the other on a bearing for driving means; and said driving means; the parts operating to rotate the rolls continuously and to separate the rolls during their rotation; and the shaft of one roll being mounted in floating journal boxes each provided with a spring to resist the lateral movement of the roll away from the other roll and to push the laterally moving roll toward the other roll; and said journal boxes.

3. The combination of separable stripping-rolls with an eccentric gear mechanism at each end of the rolls, such mechanism constructed and operating to rotate the rolls continuously and to separate them at intervals during their rotation; and driving means.

In testimony whereof I have hereunto set my hand in the presence of two subscribing witnesses, this 26th day of November 1913.

HENRY C. HEBIG.

Witnesses:
  EDWARD S. BEACH,
  EDWARD E. BLACK.